(12) United States Patent
Strawbridge

(10) Patent No.: US 6,284,689 B1
(45) Date of Patent: Sep. 4, 2001

(54) REFRACTORY MATERIAL

(75) Inventor: Ian Strawbridge, Sheffield (GB)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 09/653,976

(22) Filed: Sep. 1, 2000

Related U.S. Application Data

(63) Continuation-in-part of application No. 09/013,464, filed on Jan. 27, 1998, now abandoned.

(30) Foreign Application Priority Data

Feb. 5, 1997 (GB) .................................................. 9702284

(51) Int. Cl.$^7$ .................................................. C04B 35/52
(52) U.S. Cl. ........................... 501/94; 501/100; 501/101; 501/155
(58) Field of Search ............................. 501/94, 100, 101, 501/155, 127; 106/801

(56) References Cited

U.S. PATENT DOCUMENTS 4,140,745 * 2/1979 Hassler et al. .

FOREIGN PATENT DOCUMENTS

100445 * 9/1973 (DE) .

* cited by examiner

*Primary Examiner*—Paul Marcantoni
(74) *Attorney, Agent, or Firm*—James R. Williams

(57) ABSTRACT

The invention relates to refractory waste materials and in particular to waste materials removed from furnace linings. Refractory waste materials often have hydrolysable contaminants making the material unsuitable for use in making new products. The invention provides an economical treatment process that renders such materials suitable for reuse. The process includes maintaining a particulate feedstock created from the waste material at a temperature in the range 275–500° C. and applying superheated steam to the material.

10 Claims, 2 Drawing Sheets

REFRACTORY MATERIAL

CROSS-REFERENCE TO RELATED APPLICATIONS

This application is a continuation-in-part of application Ser. No. 09/013,464, filed Jan. 27, 1998, now abandoned.

FIELD OF THE INVENTION

The present invention relates to refractory materials and is particularly concerned with refractory materials that are recycled from otherwise waste materials.

DESCRIPTION OF THE RELATED ART

Increasing environmental awareness has fostered a move to recycling of otherwise "waste" material. Users of refractory products have begun to show such awareness, and are attempting recycle residual refractory materials.

For example, U.S. Pat. No. 4,140,745 to Hassler describes a process using superheated steam to recover magnesia from used refractory articles that contain magnesia. Hassler first hydrates magnesia to magnesium hydroxide, then carbonizes the hydroxide to magnesium carbonate, and finally decomposes the carbonate to reform magnesia. The recovery process chemically changes magnesia into a soluble magnesium compound, which can be leached from used refractory articles, and reconstitutes magnesia after separation. In any separation process, a significant quantity of original material can be lost or rejected, thereby reducing yield. Hassler's multi-step process also decreases commercial throughput.

In the steel industry, a significant quantity of refractory material finds use in recycling operations. Such refractory materials often comprise alumina, magnesia, graphite or their combinations, and are hereafter described as "magnesia-graphite" compositions. In one example of recycling, magnesia-graphite bricks that are removed from furnace linings at the end of the lining's normal life have been recycled by removing front-face contamination acquired in service and crushing to suitable particle sizes. The recycled brick could then be used as a component in new production. Recently, the use of brick recycled in this manner causes cracking of product primarily during the curing process of organic binder systems such as phenol-formaldehyde resins and pitches. Cracking is coincident with the increased use of reactive metal powders, notably aluminum powder, which act as antioxidants to protect readily oxidizable components, such as graphite, carbon black and a binder system. In service, reactive metal antioxidants form carbides and to some extent nitrides, both of which can undergo an expansile hydration reaction with water or condensation products of the usual binder systems. Expansile hydration can then cause cracking.

Reactive metal powders will likely remain important antioxidants in magnesia-graphite articles because of the improved performance such antioxidants offer. A treatment process is required to stabilize carbides and nitrides of such antioxidants in magnesia-graphite waste products before the waste can be reused. The process should hydrate contaminants, such as carbides and nitrides, but should not hydrate magnesia or alumina or cause other undesirable competing reactions. The process should also be rapid enough to be commercially feasible but retain high overall yield. Preferably the process should comprise a single step. In the case of magnesia-graphite refractories, temperatures should be high enough to accelerate the reaction but not so high as to oxidize carbonaceous components and reduce overall yield of the process.

SUMMARY OF THE INVENTION

The objective of the present invention is to provide a process for the treatment of otherwise waste refractory materials, thereby enabling their recycling and subsequent use in fresh batches of materials. Unlike prior art, the present invention avoids chemically changing magnesia, alumina and graphite.

One aspect of the invention describes a single-step process for the treatment of waste material comprising applying superheated steam to particulate feedstock formed from the reclaimed material while maintaining the feedstock material at an elevated temperature. Superheated steam, which means steam at a temperature above the boiling point of water, may be introduced into a flow of particulate feedstock, for example, by injecting the superheated steam into the particulate material. Temperature should be maintained in a range disfavoring the hydration of magnesia and alumina or the oxidation of graphite. A preferred temperature range is from about 100° C. to 500° C.

A further aspect of the invention describes prehydating hydratable contaminants in reclaimed material to produce a stabilized refractory aggregate. The stabilized aggregate is less prone to expansile hydration and reduces cracking in new product made from reclaimed material. Examples of hydratable contaminants include, for example, carbides and nitrides of reactive metals, and especially aluminum carbide and aluminum nitride.

Another aspect of the invention teaches exposing waste material, which is reclaimed from refractory lining after the end of the lining's useful life, to steam at an elevated temperature. The waste material includes magnesia-graphite scrap containing contaminants such as aluminum carbide, aluminum nitride and aluminum oxynitride. Steam can stabilize such contaminants against further reaction with water or steam during re-use of the scrap in subsequent production. Stabilization occurs without significant reduction in yield and is desirable in both resin-bonded pressed shapes and monothilics.

In a further aspect of the invention, the time during which the particulate feedstock material is exposed to superheated steam is described as depending the feedstock's mean particle size and temperature, but largely by the level of hydratable contaminants. Five millimeters is a typical mean particle size for virgin magnesia-graphite used in pressed shapes. This size represents a sensible upper mean particle size limit. A finer size reduces the diffusion path of steam to contaminants but also finds contaminants closer to the surface of the particles. Excessively fine particles can create magnesia dust, which might not benefit from stabilization and might itself hydrate to an unusable material. Use of excessively fine material could also limit its use as a feedstock for typical magnesia-graphite products. A composition that included excessive fines would have a lower magnesia-to-graphite ratio than normal because of excessive hydration of magnesia in the fines.

One embodiment of the invention exposes the particulate feedstock to superheated steam for not less than ten minutes but not greater than ninety minutes. Time of exposure is preferably between 15–45 minutes. Adequate treatment of a particulate feedstock with a mean particle size of less than 4 mm may be achieved by treating the feedstock with superheated steam for 40 minutes at 400° C.

Another aspect of the invention shows the particulate feedstock being vibrated or other agitated while superheated steam is being applied around the substantially the entire periphery of a substantial number of particles. Vibrating or agitating the particulate feedstock can provide fresh surfaces for reaction within the particulate material and reduce the duration of the treatment process. Preferably, a suitable vessel, such as, for example, a rotating reactor or rotary swept multiple level vessel, contains the particulate feedstock during the process.

DETAILED DESCRIPTION OF THE PREFERRED EMBODIMENTS

Figure 1:
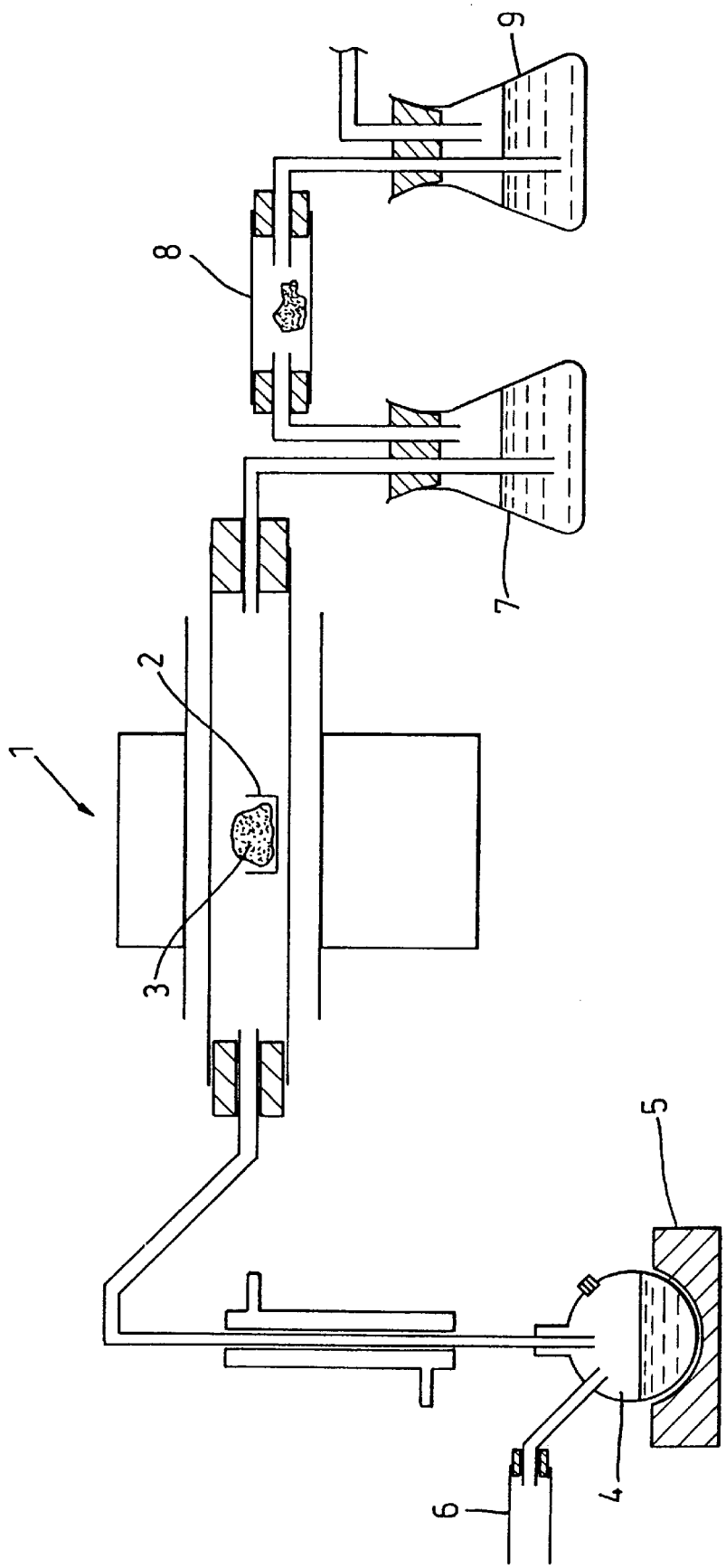
FIG. 1 is a schematic side elevation of an experimental apparatus showing the principle elements of the invention.

The experimental apparatus of FIG. 1 shows a tube furnace 1 loaded with a boat 2 of particulate material 3. Steam is generated in a vessel 4 by a heater 5, and the steam passes through the tube furnace 1 while the tube furnace 1 is held at a predetermined temperature. The system is purged by passing argon gas through a heated feed pipe 6 and through the vessel 4 into the tube furnace 1. Reaction gases, such as ammonia and carbon monoxide, emitted by the particulate material 3 are collected first in an ammonia trap 7 containing deionized water. The gases are then passed through a heated tube 8 at 300° C. containing $Fe_2O_3$ to convert carbon monoxide to carbon dioxide and then to a carbon dioxide trap 9 also containing deionized water. Concentrations of these gases in their respective traps are monitored by means of ion specific electrodes (not shown).

An experimental particulate material was formed from recovered furnace lining material, predominantly magnesia-graphite, and was specially prepared to contain a known quantity of aluminum carbide and aluminum nitride. Using the apparatus of FIG. 1, experimental particulate material was used to identify the effect of temperature, particle size and steam partial pressure on the time required to complete the treatment of magnesia-graphite material, to eliminate contaminants or to reduce them to a level that would not affect the subsequent use of the material in the production of new furnace lining. The results of the test are summarized below.

TABLE 1

| Temperature, ° C. | Feedstock Particle Size, μm | Time to Stability (minutes) Carbonate | Ammonia |
|---|---|---|---|
| 250 | −250 | 28.3 | 18.3 |
| 300 | −250 | 19.2 | 25.0 |
| 350 | −250 | 17.5 | |
| 400 | −250 | 12.5 | 18.3 |
| 450 | −250 | 10.0 | 13.3 |
| 450 | −100 +250 | 10.0 | |

From the above experiments, several competing processes potentially occur during the above experiments, namely:

Group A: desirable hydration of reactive metal carbides and nitrides;

$H_2O + \frac{1}{6} Al_4C_3 = \frac{1}{2} CH_4 + \frac{1}{3} Al_2O_3$ $H_2O + \frac{2}{3} Al_4C_3 = C_2H_2 + \frac{1}{3} Al_2O_3 + 2Al$ $H_2O + \frac{1}{6} Al_4C_3 = \frac{1}{4} CH_4 + \frac{1}{3} Al_2O_3 + \frac{3}{4} H_2$ $H_2O + \frac{2}{3} AlN = \frac{2}{3} NH_3 + \frac{1}{3} Al_2O_3$ Group B: less desirable hydration reactions;

$H_2O + \frac{1}{12} Al_4C_3 = \frac{1}{4} CH_4 + \frac{1}{3} Al(OH)_3$ $H_2O + \frac{1}{12} Al_4C_3 = \frac{1}{8} C_2H_2 + \frac{1}{3} Al(OH)_3 + \frac{3}{8} H_2$ $H_2O + \frac{1}{3} AlN = \frac{1}{3} NH_3 + \frac{1}{3} Al(OH)_3$ $H_2O + \frac{2}{3} Al = H_2 = H_2 + \frac{1}{3} Al_2O_3$ Group C: and undesirable reactions;

$H_2O + MgO = Mg(OH)_2$ $H_2O + \frac{1}{3} Al_2O_3 = \frac{2}{3} Al(OH)_3$ $H_2O + \frac{1}{3} Al = \frac{1}{3} Al(OH)_3 + \frac{1}{2} H_2$ $C + O_2 = CO_2$ $C + \frac{1}{2} O_2 = CO$ $CO + \frac{1}{2} O_2 = CO_2$ The temperature of the process should be selected so that the reactions of groups A and B are favored over group C. Thermodynamic calculations based on free energy of formations of the reactants and products suggest a lower temperature limit. Temperatures above 277° C. and 117° C. disfavor hydration reactions of magnesia and alumina, respectively. Oxidation of carbon in the scrap material provides an upper temperature limit of about 500° C. above which graphite is lost and yield decreases. Consequently, the temperature of the particulate material should be in a range from about 100–500° C. during its reaction with superheated steam. The temperature of particulate materials comprising substantially magnesia-graphite should kept around 275–500° C. This temperature range favors groups A and B reactions over group C reactions. In other words, this temperature range favors hydration of reactive metal carbides and nitrides, and disfavors the oxidation of graphite and the hydration of magnesia and alumina.

The success of the process depends on exposing the reclaimed material to steam in the temperature range appropriate to promote the desired reactions for a time sufficient to reduce the level of problem contaminants to an acceptable level, that is, where the contaminants do not crack new product into which the treated reclaimed material is added.

Figure 2:
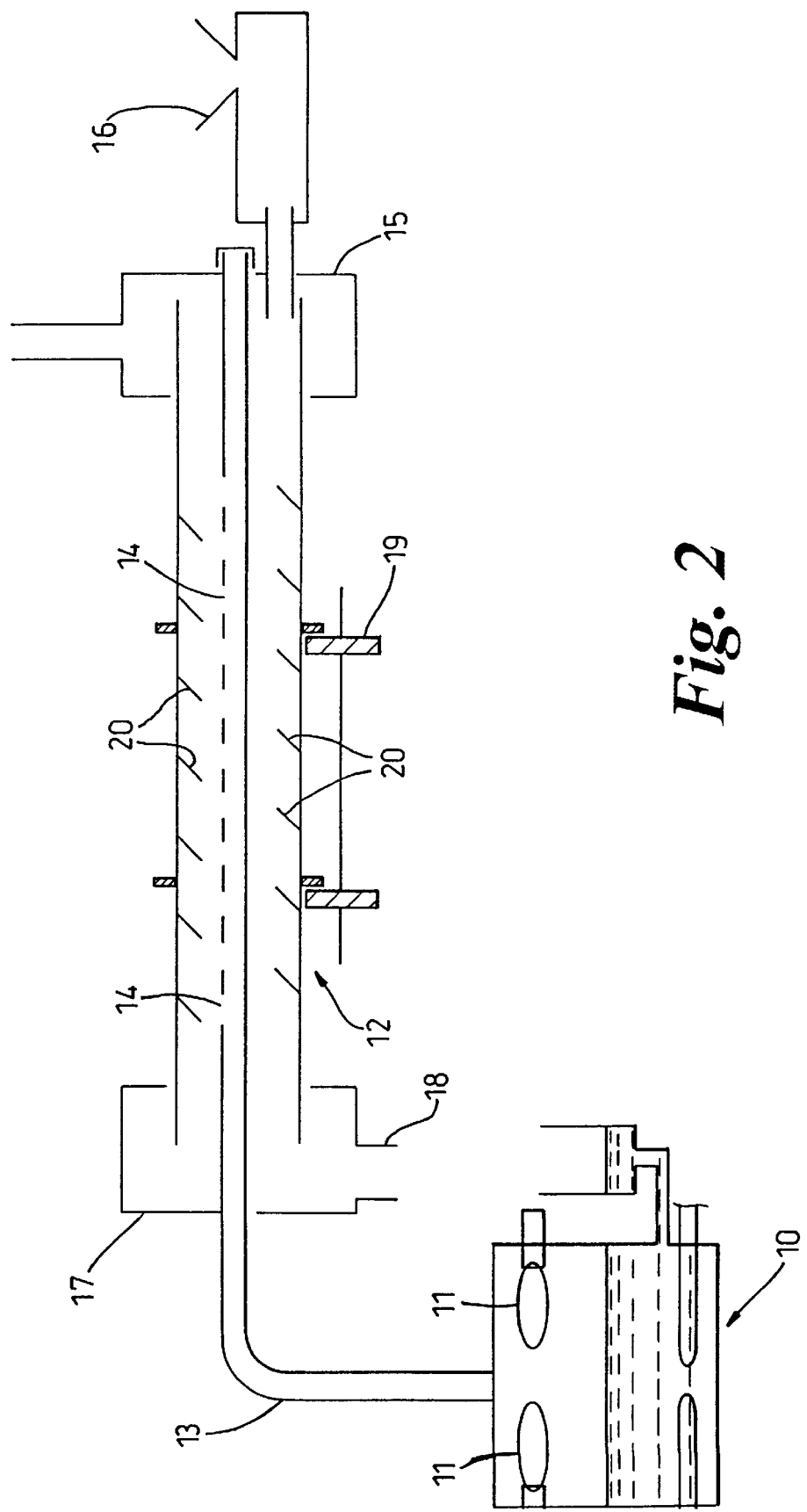
FIG. 2 is a schematic side elevation of an apparatus capable of commercially processing recovered furnace lining material.

FIG. 2 illustrates in schematic form a production facility having a steam generator 10 fitted with steam superheaters 11. The steam generator 10 provides a supply of superheated steam to an inclined rotary reaction vessel 12 through a feed pipe 13. The feed pipe has a plurality of outlets 14 along its length within the reaction vessel 12. A first end of the reaction vessel 12 has a first fixed end housing 15 with an associated material feed 16. A second end of the reaction vessel 12 has a second fixed end housing 17 with an associated treated material outlet 18. The rotary reaction vessel has an appropriate drive 19 for its rotation during the operation of the process. Material fed into the reaction vessel 12 progresses through the vessel and is agitated by strategically located paddles 20 located in the vessel 12. As the material progresses through the furnace, superheated steam generated in the steam generator 10 is injected though the outlets 14 in the feed pipe 13 into the vessel 12. Various factors, including for example, the vessel's rotation speed, angle of inclination and diameter/length ratio, affect the residence tine of the material in the vessel 12.

In one example, a magnesia-graphite material known to contain aluminum carbide and aluminum nitride was reclaimed from a furnace lining. The reclaimed material was crushed to a mean particle size of less than 4 mm and introduced into a reaction vessel. The material was then subjected to superheated steam at 400° C. for 40 minutes. Problem contaminants were effectively converted to a stable form, which would permit successful use of the treated reclaimed material as a component in the production of fresh furnace lining or pressed products. Treated reclaimed material can also be used as part of a batch in magnesia-graphite pressed forms or monolithics. The resulting products are dimensionally stable and show reduced cracking under normal conditions.

A variation of the process also employs the production facility of FIG. 2. Magnesia-graphite scrap known to have contained aluminum antioxidants was crushed to create a particulate feedstock. The feedstock was substantially capable of passing through a 3 mm screen. The feedstock was charged to the rotary reaction vessel and exposed to superheated steam, which entered the chamber at greater than 350° C., for an average period of 40 minutes. After treatment and drying, the treated material contributed 30 wt. % of a batch to make a 15 wt. % carbon resin-bonded magnesia-graphite bricks. On curing, the newly fashioned articles containing the treated material showed good dimensional stability and no signs of cracking on storage under normal conditions.

What is claimed is:

1. A process for producing a stabilized refractory aggregate from material comprising graphite and at least one oxide selected from the group consisting of magnesia and alumina, the process comprising applying superheated steam to a particulate feedstock formed from the reclaimed material while maintaining the particulate feedstock at a temperature from 100–500° C. so that the oxide and graphite are substantially non-reactive and hydratable contaminants in the particulate feedstock are hydrated.

2. The process of claim 1, wherein superheated steam is injected into a flow of particulate feedstock.

3. The process of claim 1, wherein the particulate feedstock has a mean particle size up to 5 mm.

4. The process of claim 1, further comprising agitating the particulate feedstock while applying superheated steam.

5. The process of claim 1, wherein superheated steam is applied to the particulate feedstock for a time ranging from 10–90 minutes.

6. The process of claim 3, wherein the mean particle size is less than 4 mm, the temperature of the particulate feedstock ranges from 400–450° C., and superheated steam is applied to the particulate feedstock for at least 40 minutes.

7. The process of claim 1, wherein the stabilized refractory material is suitable for use as a component in pressed shapes and bricks.

8. A process for producing a stabilized refractory aggregate from material containing magnesia-graphite reclaimed from a refractory lining after the lining's useful life comprising:
   placing a particulate feedstock formed from the reclaimed material in a vessel; and
   applying superheated steam to the particulate feedstock while maintaining the particulate feedstock at a temperature from 275–500° C. for a residence time sufficient so that magnesia and graphite are substantially non-reactive and hydratable contaminants in the particulate feedstock are hydrated.

9. The process of claim 8, wherein the residence time ranges from 10–90 minutes.

10. The process of claim 8, wherein the vessel is selected from the group consisting of an inclined rotating reactor and a rotary swept multiple level reactor.

* * * * *